United States Patent [19]
Duclos et al.

[11] Patent Number: 4,733,758
[45] Date of Patent: * Mar. 29, 1988

[54] TUNABLE ELECTRORHEOLOGICAL FLUID MOUNT

[75] Inventors: Theodore G. Duclos, Raleigh; Douglas A. Hodgson; J. David Carlson, both of Cary, all of N.C.

[73] Assignee: Lord Corporation, Erie, Pa.

[*] Notice: The portion of the term of this patent subsequent to Jan. 19, 2005 has been disclaimed.

[21] Appl. No.: 897,262

[22] Filed: Aug. 18, 1986

[51] Int. Cl.⁴ .................. B60G 17/10; F16F 15/03; F16M 5/00
[52] U.S. Cl. .................................. 188/267; 188/269; 188/320; 188/322.5; 248/562; 267/140.1
[58] Field of Search ............. 188/267, 269, 285, 299, 188/320, 322.5; 267/140.1; 248/550, 562, 566, 636

[56] References Cited

U.S. PATENT DOCUMENTS

| | | | |
|---|---|---|---|
| 2,661,596 | 12/1953 | Winslow | 188/87 |
| 3,207,269 | 12/1965 | Klass | 188/87 |
| 4,262,886 | 4/1981 | Salver et al. | 267/8 R |
| 4,458,888 | 7/1984 | Wolf et al. | 267/140.1 |

FOREIGN PATENT DOCUMENTS

| | | | |
|---|---|---|---|
| 3336965 | 5/1985 | Fed. Rep. of Germany . | |
| 112440 | 8/1980 | Japan | 188/267 |
| 129944 | 8/1982 | Japan . | |
| 57536 | 4/1983 | Japan | 188/267 |
| 113644 | 7/1983 | Japan | 267/140.1 |
| 113832 | 6/1985 | Japan . | |
| 113833 | 6/1985 | Japan . | |
| 1259802 | 1/1972 | United Kingdom . | |
| 2111171 | 6/1983 | United Kingdom . | |

Primary Examiner—Kenneth J. Dorner
Assistant Examiner—Peter R. Brown
Attorney, Agent, or Firm—Philip P. McCann; James W. Wright; David L. McCombs

[57] ABSTRACT

The mount has variable volume fluid chambers interconnected by fluid passageways and containing electrorheological fluid. Valves are arranged in series with a plurality of the passageways. Each valve has a flow area greater than that of the passageway in series therewith. Energization of a valve generates an electrical field effective to so increase the apparent viscosity of the fluid within the valve as to prevent fluid flow through the passageway in series with it. Selective energization of the valves, by suitable controls associated therewith, varies the frequencies at which fluid inertia forces cause the mount to undergo abrupt changes in dynamic stiffness. The valves may be located upon opposite sides of a central mount section through which the chamber connecting passages extend. Electrode elements of the valves are preferably so shaped as to minimize fluid drag and electrical concentration. In one embodiment the passageways all communicate at one end with a common variable volume chamber, while communicating at their opposite ends with respective ones of a plurality of different chambers.

18 Claims, 9 Drawing Figures

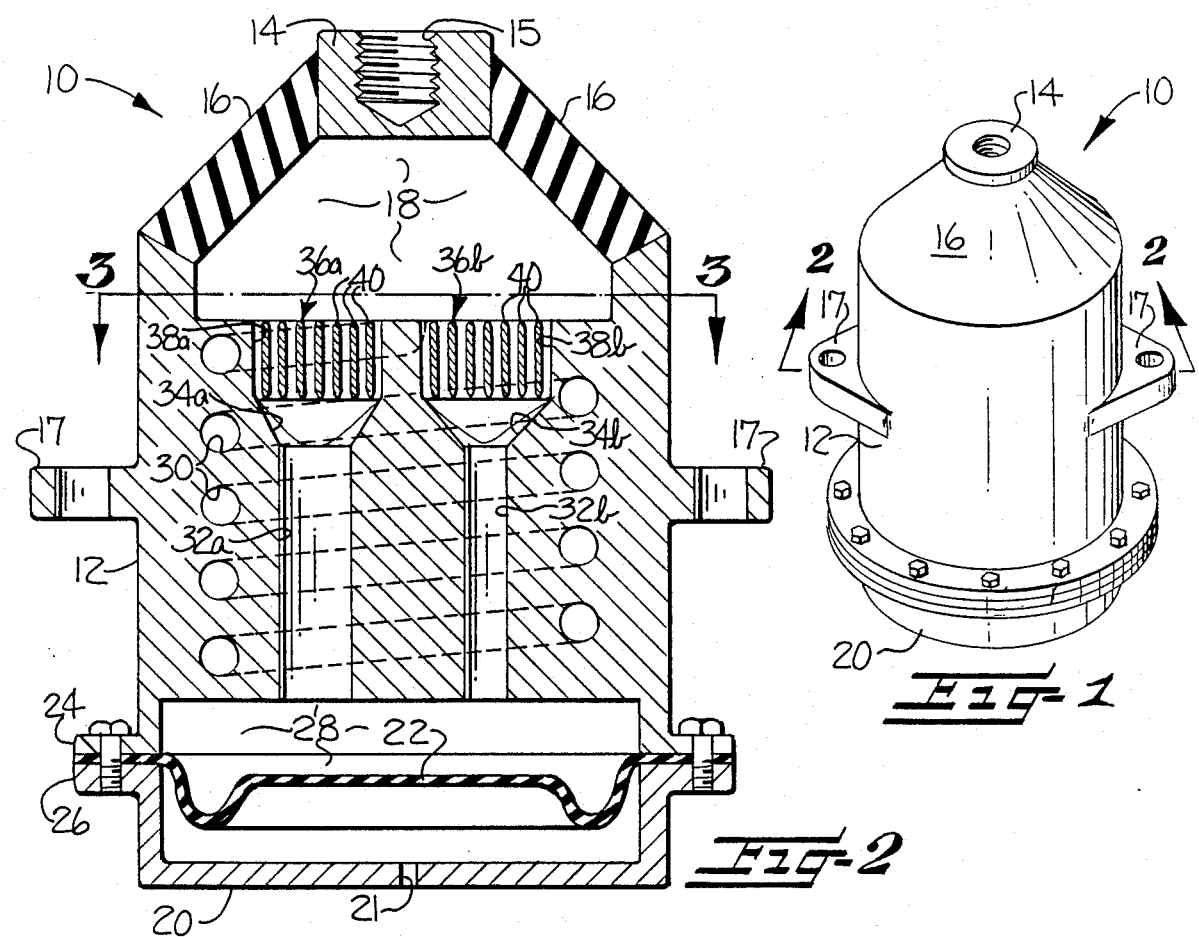
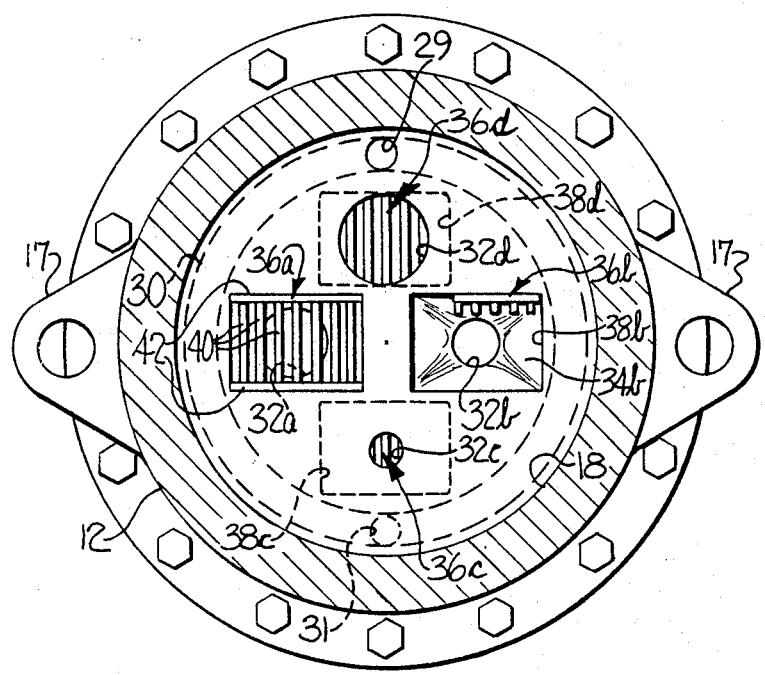
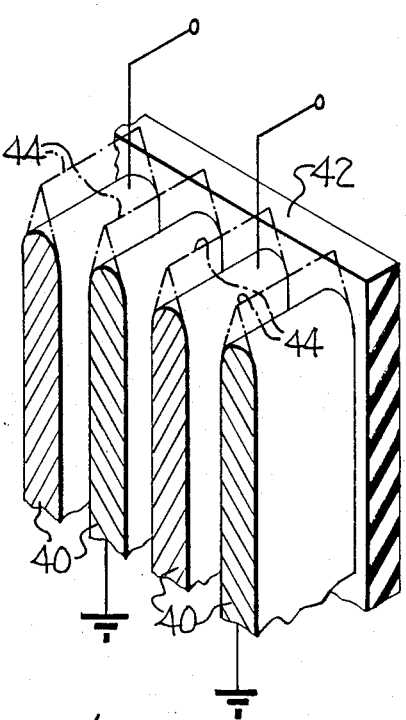

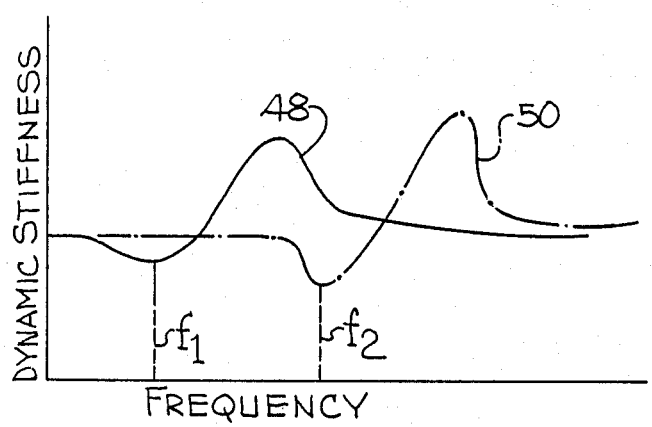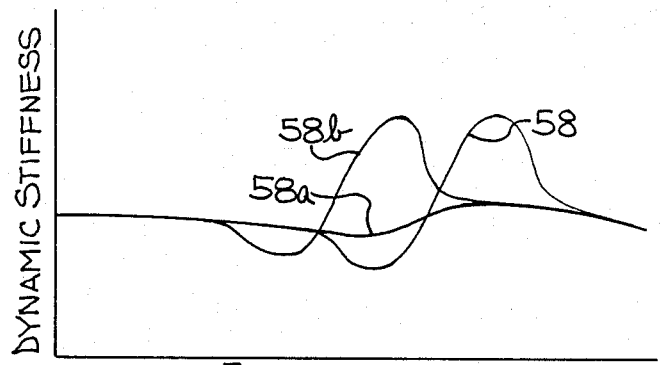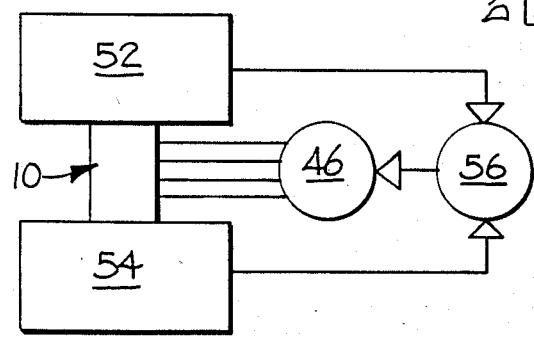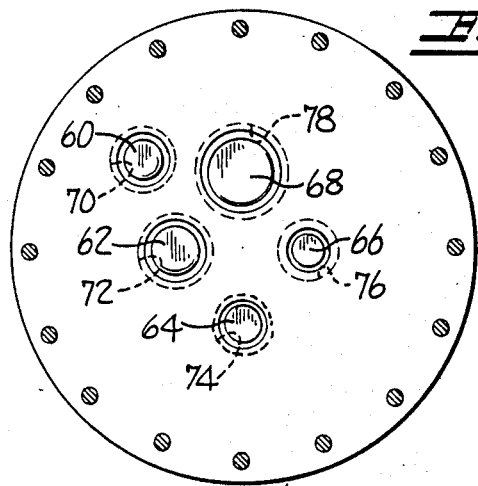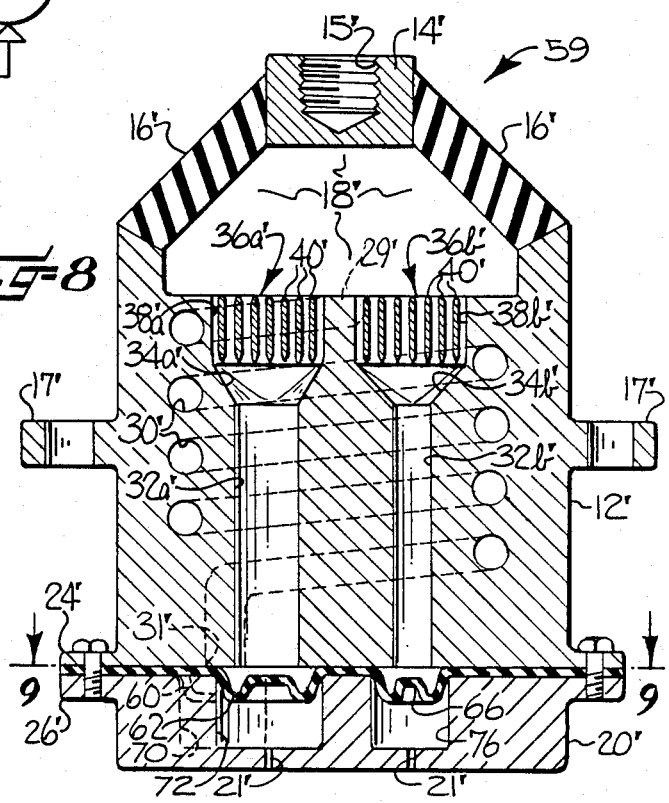

TUNABLE ELECTRORHEOLOGICAL FLUID MOUNT

This invention relates to vibration attenuating mounts or similar devices of the type utilizing hydraulic fluid to generate inertia forces that are effective at certain excitation frequencies to markedly alter the dynamic stiffness characteristics of the mounts. The invention more specifically relates to a mount of the aforesaid type that contains an electrorheological fluid and is tunable by the application of a high voltage electrical field to such fluid.

BACKGROUND OF THE INVENTION

Fluid mounts of the "hydraulic damper" type have long been used in vehicular and other applications to dampen shocks and/or vibrations. A typical hydraulic damper has interconnected variable volume chambers between which hydraulic fluid passes during excitation of the mount. Resistance of the fluid to flow between the chambers opposes and damps vibratory and similar forces imposed upon the mount. The viscous damping forces generated by the mount are proportional to, among other things, the viscosity of the hydraulic fluid and the extent to which its flow between the chambers is "throttled" or otherwise impeded by the orifice or conduit through which the fluid passes. The use of hydraulic fluids of relatively high viscosity is therefore acceptable and desirable in many viscous fluid dampers.

A newer type of fluid mount, which has received increasing acceptance within recent years, utilizes fluid inertia forces to achieve and/or to enhance the desired attenuation of vibratory forces. A plot of the dynamic stiffness against the excitation frequency of mounts of the fluid inertia type typically includes a notch-like region, at which the dynamic stiffness of the mount is greatly reduced and may be considerably less than its static stiffness, followed by a "peak" of large dynamic stiffness. A mount may be so designed as to cause the foregoing abrupt variations in its dynamic stiffness to occur at a particular excitation frequency where a specific vibration problem exists. For example, objectional "drone" noise occurring within some automobiles as a result of transmission to their frames of engine firing vibrations generated at a particular engine speed, may be substantially eliminated by the use of an inertia type engine mount that is specifically designed so as to possess its minimum-stiffness "notch" at the frequency of the aforesaid vibrations.

While static mount tuning is satisfactory for the attenuation of troublesome vibrations occurring at only one particular frequency, problem vibrations such as those producing vehicle "drone" noise may occur at a number of significantly differing engine speeds and mount excitation frequencies. In such a situation it is highly desirable for a mount to be dynamically tunable so as to permit selective variation during mount operation of the frequencies at which the mount has very low dynamic stiffness. Since the frequency at which stiffness reduction occurs is a function of, among other things, the size of the fluid flow path between the variable volume chambers of the mount, one theoretically possible way of dynamically tuning the mount is by varying the flow path cross-sectional area. In a mount containing a plurality of flow passageways between the chambers, this result should be realizable by selective opening and closing of valve means associated with one or more of the passageways. However, the expense, complexity and/or relative slowness of operation of conventional mechanically or electromechanically actuated valves makes their use less than satisfactory for the foregoing purpose.

A possible alternative to the use of conventional valves and conventional hydraulic fluids, such as glycol and/or water, is the use of "valves" that generate electrical force fields and of fluids that undergo substantial rheological changes in the presence of appropriate electrical fields. Two types of field responsive fluids, whose use has heretofor been proposed in fluid mounts of the viscous damper type, are magnetic fluids and electrorheological fluids. While differing in various significant respects, magnetic and electrorheological fluids both increase in apparent viscosity (i.e. in the extent to which they resist flow under applied stress) when subjected to a magnetic field and to a high voltage electrical field, respectively. While such fluids may be satisfactorily utilized in fluid mounts that merely produce viscous damping, their use normally is not satisfactory in mounts that generate and utilize fluid inertia effects. Magnetic fluids customarily have high apparent viscosity even when not exposed to a magnetic field, and the particles therein retain their polarities for an appreciable time period after each exposure of the fluid to such a field. Consequently, the flow resistance or "drag" of the "unactivated" fluid is so great as to prevent the generation of any significant fluid inertia forces. While having a lower apparent viscosity in their unactivated state, as well as being superior in other respects to magnetic fluids, the apparent viscosity of deenergized electrorheological fluids still will usually be some twenty or more times greater than that of the water and/or glycol fluids customarily utilized in inertia type mounts. The problem presented by the greater apparent viscosity of electrorheological fluids is compounded by the fact that the field-producing electrodes of the valve between which the fluid passes must usually be spaced closely to one another if the fluid is to withstand, without shear and when activated by the electrical field, a large magnitude pressure differential across the valve. The resistance of the fluid to flow through the spaces or gaps between the valve electrodes is inversely proportional to the cube of the width dimension of the gap. Attempted utilization of closely spaced electrodes which extend along all or most of the length of the or each fluid passageway between the mount chambers, which passageway is customarily relatively long in inertia type mounts, results in such high flow resistance and reduced flow as to impede generation of inertia forces of the desired magnitude. Consequently, the desired abrupt decrease in mount dynamic stiffness is not realized during mount operation.

DESCRIPTION OF THE PRIOR ART

The Japanese patent applications of publication Nos. 60-113832A and 60-113833A disclose fluid mounts having variable volume chambers interconnected by a plurality of passageways, at least one of which is closeable during mount operation by an associated valve member.

The German published patent application of Offenlegungsschrift DE No. 3336965A1 discloses a fluid mount containing electrorheological fluid whose flow through a passageway, interconnecting variable volume chambers of the mount, is controlled by an electrical field generated across such passageway between electrode plates that extend along substantially its entire length Japanese patent application publication No. 57-129944 discloses a fluid mount containing magnetic fluid whose flow between the mount chambers and through an interconnecting small hole is controlled by a magnetic field generated in the vicinity of such hole. The magnetic valve may be responsive to various senaed conditions, such as vehicle engine speed.

SUMMARY OF THE INVENTION

In accordance with the present invention, an inertia type fluid mount has a plurality of elongate inertia track passageways interconnecting variable volume chambers filled with electrorheological fluid that undergoes a marked increase in apparent viscosity, and in effect substantially solidifies, when subjected to a high voltage electrical field of sufficient intensity. valve means, capable of generating an electrical field of the aforesaid type is provided in series with at least one of the aforesaid passageways. The valve means preferably has a cross-sectional flow area of at least about 1.5 times, and more preferably at least twice, that of the cross-sectional flow area of the inertia track passageway. The valve has a plurality of parallel flow paths bordered and defined in part by electrode elements between which electrical fields extend when a high voltage potential exists between adjacent ones of them. During each such energization of the valve, solidification of the fluid therein blocks the inertia track passageway in series therewith and thus varies the total area of the fluid flow passageways between the mount chambers. Deenergization of the valve permits fluid flow through it and through its inertia track passageway. The greater overall flow area of the valve compensates for the drag or frictional forces exerted upon the fluid during its passage between the relatively closely spaced valve electrodes, such that the desired rapid oscillatory flow of fluid through the inertia track passageway is not unduly retarded. Consequently, generation of the desired inertia forces is possible notwithstanding the greater apparent viscosity of electrorheological fluid and the relatively close spacing between the valve electrodes.

In a preferred embodiment of the invention, a plurality of valved inertia track passageways interconnect the mount chambers, and each valve means and its associated passageway communicate via a transition passageway of smoothly varying cross-sectional area. Selective energization and deenergization of the various valves, by suitable control means connected thereto, causes the low dynamic stiffness notch to occur selectively at differing excitation frequencies of the mount.

DESCRIPTION OF THE DRAWINGS

Other features of the invention will be apparent from the following description of illustrative embodiments thereof, which should be read in conjunction with the accompanying drawings, in which:

FIG. 1 is a perspective view of a mount in accordance with invention;

FIG. 2 is an enlarged vertical cross-sectional view of the mount;

FIG. 3 is a view, taken along the line 3—3 of FIG. 2 and showing some mount components in horizontal section and others in top plan, with one valve component being partially broken away to better disclose underlying structure;

FIG. 4 is an enlarged fragmentary view of a portion of one of the valve means of the mount;

FIGS. 5 and 6 are illustrative plots of mount dynamic stiffness against excitation frequency;

FIG. 7 is a schematic view of the mount in association with vehicle and control components;

FIG. 8 is a cross-sectional view of an alternative mount construction; and

FIG. 9 is a view taken along the line 9—9 through the lower part of the mount of FIG. 8.

DESCRIPTION OF THE ILLUSTRATED EMBODIMENTS

The numeral 10 in FIGS. 1 and 2 designates a fluid mount or similar device of the type generating fluid inertia forces to attenuate the transmission of vibrations and/or shock forces between relatively movable vibration transmitting and receiving members (not shown), such as the engine and frame components of an automobile or other vehicle. The housing of mount 10 includes a rigid central element 12 and a rigid upper element 14 interconnected for vertical movement relative to each other by a resilient spring-like elastomeric element 16 of generally fustoconical shape. Housing section 12 is adapted to be fixedly connected, as by means of the illustrated brackets 17 thereon, to one of the two members (not shown) interconnected by the mount. Upper housing element 14 is similarly adapted to be connected, as by use of its illustrated threaded bore 15, to the other of such members. The foregoing housing components define a variable volume fluid chamber 18, the capacity of which is decreased and increased by relative movement of housing elements 12, 14 toward and away from each other, respectively. Adjacent its lower end, the housing of mount 10 further includes a rigid end cap element 20 and a resilient and flexible rolling diaphragm element 22 made of elastomer or similar material. The periphery of diaphragm 22 is clamped in a fluid tight manner between bolted together peripheral flanges 24, 26 respectively provided upon housing elements 12, 20. Cap 20 has a vent opening 21 within its lower wall. The space between diaphragm 22 and the overlying surfaces of central housing element 12 define a second or lower variable volume fluid chamber 28 that is interconnected with the first or upper chamber 18 by passageway means provided within housing element 12 and to now be described.

Referring now also to FIG. 3 of the drawings, the means interconnecting chambers 18, 28 includes an inertia track passageway 30 that extends in helical fashion about the elongate central (and, in the illustrated orientation of mount 10, vertical) axis of mount 10, and additional inertia track passageways 32a, 32b, 32c, and 32d that are spaced radially from the aforesaid mount axis and extend vertically in generally parallel relationship to it. Each of the passageways has a substantially circular cross-sectional shape, which minimizes frictional drag upon fluid passing therethrough, and has a length that usually and illustratively is considerably larger than its diameter. Ports 29, 31 (FIG. 3) at the opposite upper and lower ends of passage 30 communicate with mount chambers 18, 28, respectively. Except for having different diameters and, in some instances, differing orientations of their opposite ends, each of the remaining passageways 32 are of substantially the same construction as the passageway 32a to be now described.

The lower end of passageway 32a opens from the undersurface of housing element 12 and communicates directly with the thereto adjacent lower fluid chamber 28 of mount 10. Adjacent its upper end passageway 32a communicates via a transition passageway 34a with electric field generating valve means 36a disposed within a generally rectangularly-shaped recess 38a opening from the upper central horizontal surface of housing element 12. As is also shown in FIG. 4, valve 36 includes a plurality of laterally spaced plate type electrodes 40 that extend vertically in substantially parallel relationship to another and to a pair of the opposite end walls of recess 38a. The gaps or spaces between adjacent ones of electrodes 40, and between each end-most one of them and an adjacent wall of recess 38a, define a plurality of parallel flow paths through valve 36a. The opposite ends of electrodes 40, which are formed of aluminum or other conductive material, are mounted by and received within holders 42 formed of rigid non-conductive plastic or similar material. The upper and lower edges of electrodes 40 are rounded to discourage electrical concentrations and arcing, and also to minimize drag upon fluid flowing through valve 36a. As is indicated by phantom lines in FIG. 4, wedge-shaped elements 44 formed of non-conductive material may if desired be bonded or otherwise fixedly secured upon the aforesaid electrode edges to further minimize their resistance to fluid flow. Drag upon the fluid passing between valve 36a and its associated inertia track passageway 32a is minimized by providing the interconnecting transitional passageway 34a with a tapering cross-sectional shape providing a smooth transition for fluid flowing in either direction between the larger area valve recess 38a and the smaller area passageway 32a.

As is schematically indicated in FIGS. 4 and 7, suitable electrical leads connect the end-most electrodes 40 of valve 36a, and also alternate ones of the electrodes therebetween, to a command-responsive switching device 46 (FIG. 7) effective upon command to connect such electrodes with a battery or other source (not shown) of high voltage electricity. The remaining electrode plates 40 of valve 36a, and preferably also the entire central housing element 12 of mount 10, are electrically grounded by suitable leads connected thereto. As a result of the foregoing arrangement, when switching device 46 imposes a high electrical voltage upon the valve 36a electrodes 40 connected to it, intense electrical fields are generated between each of the foregoing electrodes 40 and each of the thereto adjacent grounded electrodes 40. Identical electrical fields are simultaneously also generated between the end-most two electrodes 40 and the thereto adjacent end walls of valve recess 38a.

Although not shown in the drawings, substantially all of the open space above diaphragm 22 within the interior of mount 10 is filled with an electrorheological fluid. As is well known to those skilled in the art, such fluids have nearly Newtonian type flow characteristics in the absence of an electrical field. However, in the presence of a high voltage electrical field such fluids undergo a substantial increase in apparent viscosity, and will assume a substantially solid or gel-like condition when the field is of sufficiently high intensity. In their field-energized states, the fluids have rheological properties similar to those of a "Bingham Plastic" and do not undergo any shear or flow under applied stresses of increasing magnitude up to a maximum "yield-point" stress. For a given electrorheological fluid, the yield-point stress is a function of the intensity of the electrical field applied to the fluid. The field intensity is, in turn, a function of the distance of the fieldproducing electrodes from one another. Electrorheological fluids customarily are comprised of solid hydrophilic particles suspended within hydrophobic liquids. While other compositions might be equally satisfactory, that preferred for use in mount 10 consists of a mixture of precipitated silica particles suspended within silicone oil and a surfactant such as glycerol monooleate. The viscosity of the fluid in its unactivated state, i.e. when it is not exposed to an electrical field, should be as low as possible without significant impairment of the desired electrorheological properties. In one particular application, the fluid viscosity was approximately 30 centipose. While such viscosity is quite low in comparison to that of many other electrorheological fluids, it is still some 30 times greater than the water and glycol solutions customarily used in fluid mounts that generate inertia forces. When only viscous damping is desired, as is the case with many fluid mounts, the greater viscosity of electrorheological fluid is acceptable and may even enhance operation. However, in inertia-type fluid mounts, the greater viscous flow resistance of electrorheological fluids tends to cause the inertia forces generated by such mounts to be of reduced magnitude and therefore tends to cause the effects of the inertia forces upon the dynamic stiffness of the mounts to be less pronounced. The foregoing problem is aggravated by the fact that the electrodes between which the fluid passes must be spaced relatively closely adjacent each other if the electrical field generated at desired times therebetween is to be of sufficient intensity as to then enable the solidified fluid to resist shearing under pressure differentials of the considerable magnitude present within the mount during its operation. The use in mounts of closely spaced electrodes that extend along all or substantially all of the length of passageways between the mount chambers, in conjunction with the relatively large viscosity of electrorheological fluid even in its unactivated state, can quite easily cause such resistance to fluid flow as will greatly diminish if not altogether eliminate generation of the desired fluid inertia forces and their effects upon the mount operating characteristics.

The mount 10 of the present invention overcomes the foregoing problems. Its fluid passageway 32a is free of any electrodes and imposes only minimum drag upon the fluid passing therethrough. The total flow area of valve 36a is sufficiently greater than the flow area of its associated passageway 32a as to not greatly retard the faster oscillating flow of fluid through passageway 32a when valve 36a is not activated, notwithstanding the slower velocity of the fluid then contemporaneously oscillating within the numerous parallel flow paths of valve 36a. The tapering cross-sectional shape of transition passageway 34 between inertia track passageway 32a and valve means 36a minimizes turbulence within the fluid passing between the latter components, and thus additionally contributes to the desired result.

Application of an electrical voltage of appropriate magnitude to the electrodes 40 of valve 36a that are connected to switching device 46 effects prompt solidification of the electrorheological fluid within the flow paths of the valve. This of course stops the flow of fluid not only through the valve 36a, but also through the passageway 32a in series therewith. The no-flow condition persists for as long as valve 36a is maintained "closed" by the continued application of high voltage to it. Upon cessation of the electrical voltage to valve 36a, the apparent viscosity of the electrorheological fluid within the valve promptly returns to its normal magnitude, permitting the resumption of flow through the valve and passageway 32a.

In keeping with the arrangement described above with respect to valve 36a and passageway 32a, valve 36b and its associated transition passageway 34b are located adjacent the upper end of the passageway 32b in series therewith. Valves 36c and 36d differ only in that they and their associated transition passageways (not shown, but of the same type as those associated with valves 36a and 36b) are located adjacent the lower ends of the passageways 32c, 32d respectively in series therewith. The dispersed location of valves 36 at both the upper and lower sides of housing section 12 permits some or all of the valves to be of a size much greater, in at least one horizontal dimension, than is shown in FIGS. 2 and 3. The dispersed location of the valves also facilitates dissipation of the heat generated by their operation. This is important since the electrical conductivity of electrorheological fluids increases with their temperature. If allowed to overheat, the greater conductivity of the fluid could cause the system to consume more power, thus causing further overheating and even greater power consumption until the capacity of the power source is exceeded or there is arcing of electrical current through the fluid. To prevent these highly undesirable consequences, the aluminum or other material of which housing element 12 is formed should be a good conductor of heat, so that heat generated by valve operation will be conducted to the exterior of housing section 12 and then dissipated by convection and/or radiation from its exterior surface.

In FIG. 5 of the drawings, to which reference is now made, the solid line curve 48 is typical of one realized during operation of mount 10 with all of the valves 36 energized or "closed", and with only the unvalved mount passageway 30 open. At a particular frequency $f_1$ the movement of fluid within passageway 30 generates inertia forces causing the dynamic stiffness of mount 10 to be of a reduced magnitude, which may be and illustratively is lower than the static stiffness of the mount. As is typical of inertia-type fluid mounts, the aforesaid low-stiffness "notch" in curve 48 is followed at a slightly higher frequency by a high-stiffness "peak" in the mount's dynamic stiffness. The particular frequency $f_2$ at which the foregoing occurs is dependent upon a number of factors that include the dimensions of passageway 30, the effective "piston area" of mount 10, the "compliance" of its chambers 18, 28, the density and viscosity of the fluid within the mount, etc. The phantom line curve 50 of FIG. 5 represents the changed dynamic stiffness condition presented during operation of mount 10 when all valves 36 are deenergized or "open", so as to permit oscillating fluid flow through each of the four passageways 32 as well as through unvalved passageway 30. As a result of the greater flow area between the mount chambers, the dynamic stiffness "notch" and "peak" have shifted to the right, such that a region of minimum stiffness comparable to that previously occurring at frequency $f_1$ now instead occurs at a higher frequency $f_2$. While the plot of FIG. 5 illustrates only the results ensuing when the cross-sectional flow area between the mount chambers is minimum (curve 48) and maximum (curve 50), fourteen additional conditions of intermediate flow area can be achieved by selective energization and deenergization of differing ones of the valves 36 when, as in the illustrated mount 10, there are four valved passageways 32 of differing diameters, as well as the unvalved passageway 30. Although not illustrated in the drawings, these additional fourteen flow-area conditions would result in fourteen additional curves between the illustrated curves 48, 50 each containing a low stiffness "notch" at a frequency different from that of any of the other fifteen curves. In addition to progressively increasing the frequency at which the mount possesses minimum dynamic stiffness, all or desired ones of the progressive increases in the cross-sectional flow area between the mount chambers may increase the depth of the low-stiffness "notch" and the height of the large stiffness "peak" in the dynamic stiffness curves.

FIG. 7 diagramatically illustrates mount 10 interconnecting engine and frame components 52, 54 of an automobile of the like. Valves 36 are energized and deenergized selectively by suitable switching means 46 connected to a high voltage source (not shown) and controlled by a computer 56 or similar controller receiving input signals from sensors (not shown) associated with engine 52 and/or frame 54, as well as from other sources such as an internal program. The system enables mount 10 to be dynamically tuned during operation of the vehicle so as to achieve conditions of either minimum or maximum dynamic stiffness at any or all of sixteen differing frequencies of excitation of the mount.

Ordinarily the voltage applied to each valve 36 would be changed substantially instantaneously between zero and whatever predetermined high voltage produces an electric field of an intensity sufficient to effect substantially instantaneous "solidification" of the fluid and resulting cessation of fluid flow through the valve and its associated inertia-track passageway. In one embodiment of a mount in accordance with the invention, wherein the gap or spacing between the electrodes was approximately 1.5 mm, this result ensues when the applied voltage is approximately 6000 volts. If the application of such voltage to one of the valves 36 were effected gradually, rather than substantially instantaneously, the initial effect would be to change only the amplitudes of the minimum stiffness "notch" and maximum stiffness "peak" of the dynamic stiffness curve of the mount, without changing the frequency locations of the "notch" and "peak" regions of the curve. This is illustrated in the plot of FIG. 6, wherein the curve 58 is typical of one produced when all valves 36 are at zero volts, the curve 58a is typical of that produced when one value 36 is under a "partial" applied voltage of, for instance, 2000 volts, and curve 58b is typical of that produced when the latter valve 36 is under a full applied voltage of about 6000 volts.

FIGS. 9 and 10 of the drawings show a mount 59 of modified construction. Components of mount 59 corresponding to components of previously described mount 10 are designated by the same reference numerals, with the addition of a prime designation. While the mount 10 of FIG. 1 has only a single rolling diaphragm 22 and lower chamber 28, with which all of the fluid passageways 30 and 32 communicate, mount 59 has a plurality of interconnected but discrete rolling diaphragms 60, 62, 64, 66 and 68 respectively defining, in conjunction with central housing section 12', a plurality of lower variable volume chambers 70, 72, 74, 76 and 78. Chamber 70 communicates with unvalved passageway 30' of mount 59. The remaining four chambers 72, 74 76 and 78 communicate with respective ones of the four valved passageways (only two of which 32a' and 32b' are shown in FIG. 9) of mount 59. As previously noted herein, the operating characteristics of inertia-type fluid mounts vary not only in accordance with changes in the flow areas between the mount chambers, but also vary in accordance with other parameters that include the chamber "compliance", i.e. the ratio of chamber volume change to chamber pressure change. By providing the chambers 62–68 with differing compliances, the operating characteristics of mount 59 may be caused to be significantly different from those of mount 10. Additional differences in the operating characteristics of both mounts could also be realized in other ways, for instance by making their valved passageways of differing lengths, instead of the same length as shown in the drawings.

Other modifications and alternative constructions will be apparent to those skilled in the art. It should therefore be understood that while illustrative embodiments of the invention have been shown and described, this was for purposes of illustration only, and not for purposes of limitation, the scope of the invention being in accordance with the following claims.

We claim:

1. A vibration attenuating mount or the like of the fluid inertia type, comprising:
   housing means, formed in part of resilient elastomeric material, having a plurality of variable volume fluid chambers and a plurality of flow passageways interconnecting said chambers;
   electrorheological fluid means disposed within said chambers and said passageways for during operation of said mount generating inertia forces effecting abrupt changes in the dynamic stiffness of the mount at certain excitation frequencies;
   adjustable means for adjustably varying said frequencies at which said changes occur, said adjustable means including valve means disposed in series with at least one of said passageways for controlling the flow of said fluid therethrough, said valve means having a plurality of parallel flow paths extending therethrough, the combined cross-sectional flow areas of said flow paths being substantially greater than the cross-sectional flow area of said one of said passageways.

2. A device in claim 1, wherein said valve means is located in relatively closely adjacent relationship to one end of said one of said passageways and in relatively distal relationship to the opposite end of said one of said passageways.

3. A device as in claim 1, and further including means interconnecting said valve means and said one of said passageways for conducting said fluid therebetween, said interconnecting means having one end portion adjacent said valve means and an opposite end portion adjacent said passageway, and having a cross-sectional flow area decreasing gradually in size from said first-mentioned end portion thereof to said opposite end portion thereof.

4. A device as in claim 3, wherein said one of said passageways is of generally circular cross-sectional shape, and said valve means and said interconnecting means; are of generally rectangular shape.

5. A mount as in claim 1, wherein said valve means includes a valve member having a plurality of laterally spaced and generally parallel electrode elements between which said fluid is received during passage thereof toward and away from said passageway, said valve means when energized generating an electrical field extending between adjacent ones of said electrode elements and effective to so increase the apparent viscosity of said fluid therebetween as to prevent substantially all fluid flow through said passageway.

6. A device as in claim 5, wherein said electrode elements have rounded surface portions for reducing resistance to fluid flow thereby and for reducing electrical concentrations thereon.

7. A device as in claim 5, wherein said valve means includes a second valve member disposed in series with a second one of said passageways for controlling the flow of said fluid therethrough independently of the flow of fluid through said first mentioned one of said passages.

8. A device as in claim 7, wherein said first and second passageways differ in size from each other.

9. A device as in claim 8, wherein said first and second passageways have different flow areas.

10. A device as in claim 9, wherein at least one of said passageways is curved in its longitudinal direction and at least another one of said passageways is substantially straight in its longitudinal direction and wherein the length of said passageways is greater than the diameter thereof.

11. A device as in claim 10, wherein each of said passageways communicates at one end with one of said variable volume fluid chambers and at its opposite end with a second one of said chambers.

12. A mount as in claim 1, wherein there are at least three of said variable volume chambers and at least two of said passageways, one of said passageways communicating with a first one of said chambers and a second one of said chambers, and the other of said passageways communicating with said one of said chambers and a third one of said chambers.

13. A vibration attenuating mount or the like of the fluid inertia type, comprising:
   a housing having a rigid central section, and means disposed adjacent opposite sides of said central section and defining therewith first and second variable volume fluid chambers;
   said central housing section having first and second passageways extending therein from opposite sides of said central section in generally parallel relationship to each other and to a central axis of said central section, said central section having a third passageway extending therein in a helical fashion about said axis and opening at its opposite ends from said opposite sides of said section, each of said passageways being of generally circular crosssectional shape, said first and second passageways having first and second differing diameters;
   electrorheological fluid means within said chambers and said passageways;
   first valve means carried by and disposed adjacent one side of said central housing section and in series with said first passageway for controlling fluid flow through said first passageway;
   second valve means carried by and disposed adjacent the opposite side of said central housing section in series with said second passageway for controlling fluid flow through said second passageway;
   each of said valve means having a cross-sectional flow area substantially greater than the cross-sectional flow area of the one of said passageways in series therewith, and each of said valve means including a plurality of electrode members extending in spaced adjacent relationship to each other for, during energization of said valve means, generating a high intensity electrical field effective to substantially solidify such of said fluid as is then adjacent said spaced electrode members;

said electrode members having surface portions extending transversely of the direction of flow of said fluid, said surface portions being of arcuate shape; and control means connected to each of said valve means for at times energizing one of said valve means while allowing the other of said valve means to remain unenergized, and for at other times simultaneously energizing both of said valve means.

14. A device as in claim 13, and further including first and second interconnecting means respectively interconnecting said first valve means and said first passageway and said second valve means and said second passageway, each of said interconnecting means having a cross-sectional area of gradually changing size from one end thereof to the other end thereof.

15. A device as in claim 13, and further including wedge shaped elements upon said surface portions of said electrode elements, said elements being formed of nonconductive material.

16. A device as in claim 13, wherein at least two of said passageways have different lengths.

17. A vibration attenuating mount or the like of the fluid inertia type, comprising:

housing means, formed in part of resilient elastomeric material, having a plurality of variable volume fluid chambers and a plurality of flow passageways interconnecting said chambers;

electrorheological fluid mean disposed within said chambers and said passageways for during operation of said mount generating inertia forces effecting abrupt changes in the dynamic stiffness of the mount at certain excitation frequencies;

adjustable valve means associated with at least one of said passageways for adjustably varying said frequencies at which said changes occur, said adjustable valve means including electrode means for when energized generating an electric field effecting substantial solidification of fluid within said valve means, said valve means having a cross-sectional flow area substantially greater than the cross-sectional flow area of said one of said passageways.

18. A device in claim 17, wherein said electrode means includes at least three electrode elements defining discrete parallel flow paths through said valve means.

* * * * *